May 13, 1969  E. N. LEITH  3,443,861
PLURAL CHANNEL OPTICAL DATA PROCESSOR
Filed June 13, 1961  Sheet 1 of 2

INVENTOR
EMMETT N. LEITH
BY
ATTORNEY
AGENT

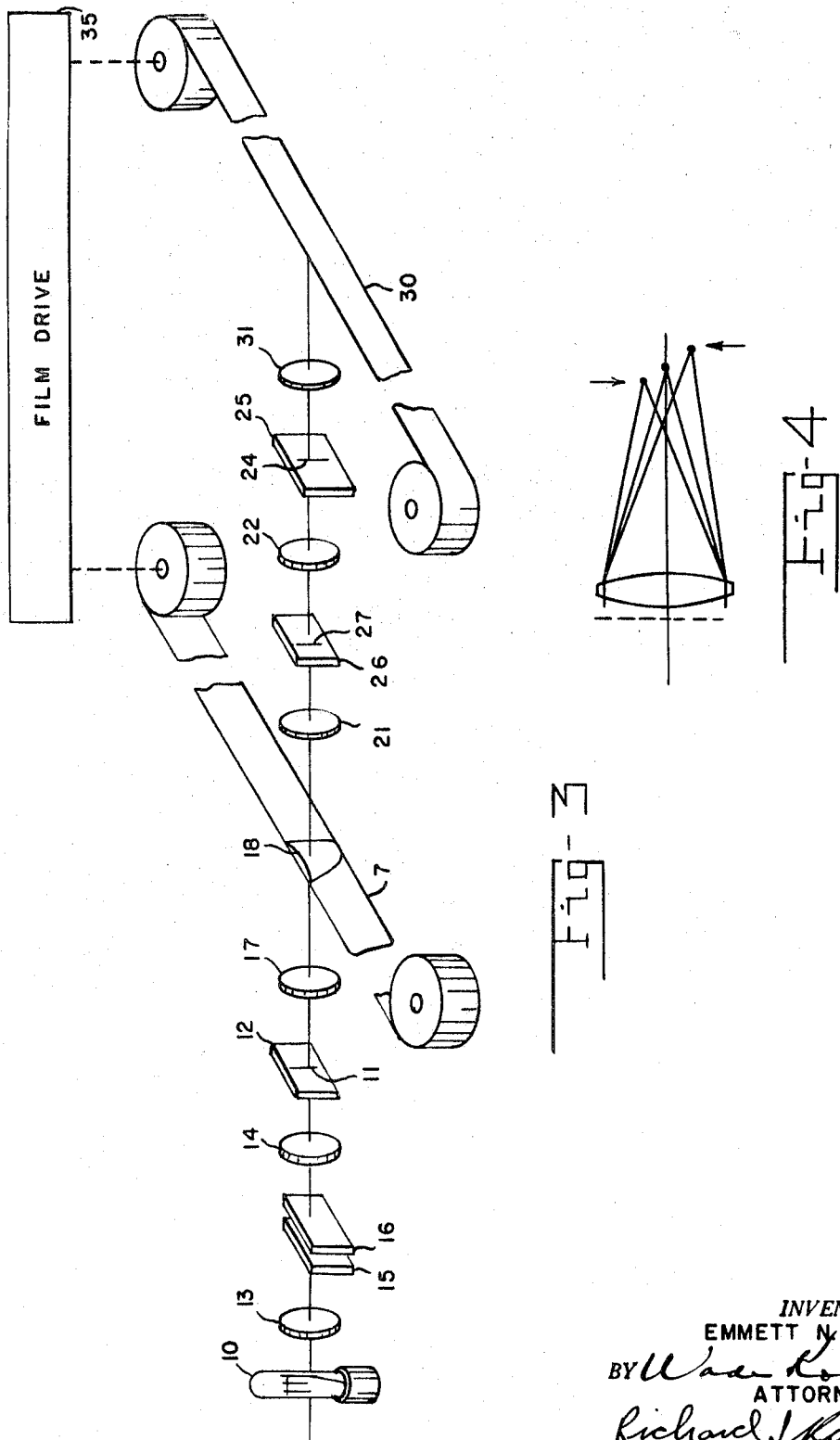

ered to the United States of America as represented by the Secretary of the
United States Patent Office 3,443,861
Patented May 13, 1969

3,443,861
PLURAL CHANNEL OPTICAL DATA PROCESSOR
Emmett N. Leith, Plymouth, Mich., assignor to the United States of America as represented by the Secretary of the Air Force
Filed June 13, 1961, Ser. No. 116,896
Int. Cl. G02b 5/18; G03b 27/02, 27/00
U.S. Cl. 350—162                    5 Claims This invention relates to a device for simultaneously processing wave trains in a great number of channels similar to that described in copending application of Blikken et al., Ser. No. 26,916, wherein the astigmatic lens combination between the signal film and the output film is made unnecessary, that is, the cylindrical lens is not needed.

Since the production of cylindrical lenses has not developed to the state of the spherical lens art, a device which makes the use of cylindrical lenses unnecessary is sometimes desirable.

The device of this invention is similar to that shown in FIGURE 10 of the Blikken et al. application, referred to above, wherein a mask containing a slit together with a spherical lens has been substituted for the cylindrical lens.

The optical system between the light source and the signal film is identical to that shown in FIGURE 10 of the above referenced application.

According to this invention, use is made of the movement of the diffracted images as the signal film is moved to provide high resolution in the output signal.

One object of the invention is to provide a device for processing Doppler frequency target information simultaneously for all ranges from information obtained from airborne coherent side-looking radar which makes the use of astigmatic optics unnecessary.

This, and other objects, will be more fully understood from the following detailed description taken with the drawing wherein:

FIG. 3 shows a three-dimensional view of an optical processor wherein high resolution is obtained by means of a slit and spherical lens combination; and FIG. 4 shows the movement of the first order images as the film is moved.

Figure 1:
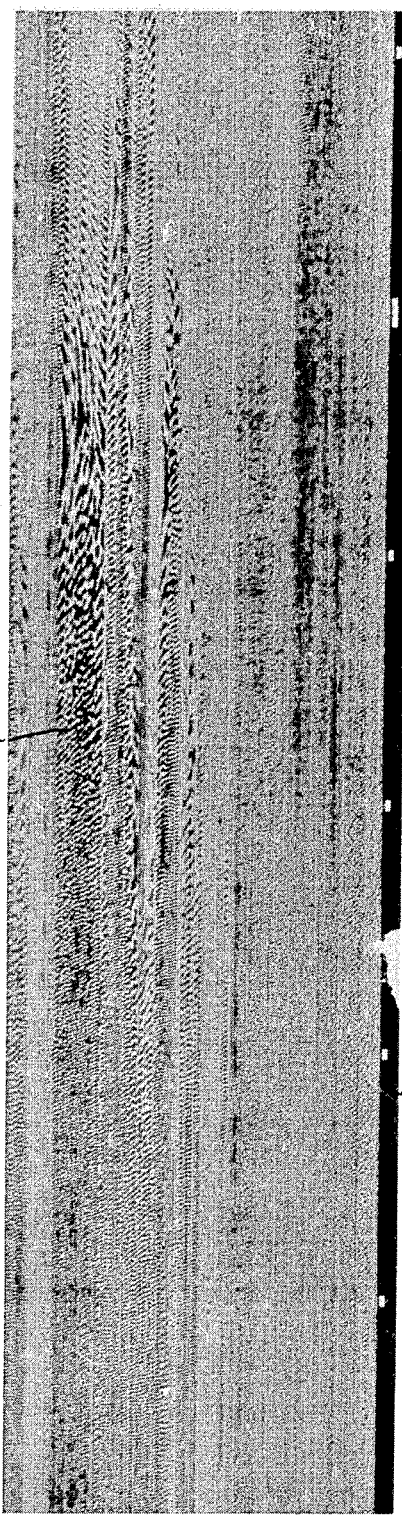
FIG. 1 shows a strip of film containing information from the recording unit of a coherent airborne side-looking radar.

The radar used to obtain the information on the film shown in FIG. 1 is a coherent radar, that is, it provides phase as well as amplitude information on all received radar signals by comparison with a stable reference oscillator. As the radar is carried along by the aircraft, a radar pulse is transmitted and the amplitude and phase of the returning signals from all targets are stored by recording on film. A short distance later another pulse is transmitted and the return signals are again recorded on the film. Continuing in this fashion the radar phase and amplitude history for each radar illuminated target is obtained over an extended distance of travel of the aircraft. All of the phase information for each target adds up to produce the Doppler history for each target from the time it enters the radar beam until it leaves the radar beam. This information can be used to give an inmproved resolution in azimuth.

The processing program in azimuth, however, is a function of range so that one needs a large number of computing channels, each having the required computer program for each particular range. The various range increments may then be assigned to the appropriate computer channels. To avoid the construction of many channels, a single channel may be provided to scan all of the required programs sequentially in synchronism with the corresponding data for the different ranges. This system requires a large bandwidth, a scanning system and a data storage system. Either of these systems constructed on an electronic basis will involve a great amount of equipment and therefore a great cost.

The operation of the system of the Blikken et al. application (for a given range) can be described as a cross-correlation of the signal with reference function which is a replica of the expected return from that range, the expected return having a form determined by the geometry of the radar antenna-target relation. Alternatively, the operation of the system can be described in terms of optical properties of the recorded signals. A recorded signal from a radar target is a linearly frequency modulated record, which resembles a diffraction grating with grating spacing varying substantially linearly along its length, of a slice taken through a zone plate. Such structures have focal properties similar to those of a lens, as likewise does the recorded signal. When the signal history brings the impinging light to focus, the resulting image is the high resolution image which is sought. The signals have focal length which is a function of range to the target. The reference function of the Blikken et al. application is, from this viewpoint, a variable focal length lens which has a different focal length for each channel and compensates for the range variation of the signal focal length.

These two viewpoints are equivalent. However, some configurations are best described from one viewpoint, some from the other.

The simplest form of optical data processor consists essentially of a light source, a slit for providing coherent illumination, a collimator, a signal film, a cylindrical lens, a photographic lens, an analyzer slit and a recording film. This simple device can be used only for a very limited range interval due to the change in focus with range. For a more extended range interval, means must be provided to correct for the change in focus.

Figure 2:
FIG. 2 shows a radar picture including the information obtained from the strip of film shown in FIG. 1.

Referring more particularly to FIG. 1 of the drawing which shows a strip of film 7 having thereon signal histories from many targets as shown at 8. When the information on film 7 is processed in the processor of FIG. 3, the radar picture shown in FIG. 2 is obtained with the area corresponding to that shown in FIG. 1 being designated as A.

FIG. 3 of the drawing shows a line light source 10, for example, a mercury vapor lamp. The light from light source 10 is imaged upon a slit 11 in a mask 12 by means of a pair of spherical lenses 13 and 14. The dimensions of the slit 11 are determined in the manner described in the Blikken et al. application referred to above. Between the lenses 13 and 14 heat reflecting filter 15 and optical filter 16 are provided so that the signal film may be illuminated with monochromatic light and is also protected from heat damage. The light illuminating the signal film 7 is collimated by lens 17. The slit 11 is narrow in the azimuth direction and elongated in the range direction of the information on signal film 7. Correction for focus with range is provided by conical lens 18 as described in the Blikken et al. application referred to above.

The lens combination 21 and 22 images the range information from the signal film 7 onto the final slit 24 in mask 25. A mask 26 located in the focal plane of lens 21 has a narrow slit 27 therein. The slit 27 acts as a narrow band pass filter and has a width comparable to the width of one of the diffracted images as described in the Blikken et al. application.

As the signal film is moved, by means of film drive 35, the diffracted first order images are moved across the mask 26 so that the slit 27 samples the signal histories for the different targets moving across slit 27. Since the lens combination 21 and 22 images the range information from the signal film 7 at the output slit 24, it will likewise image the azimuth image from signal film 7 on output mask 25. Thus, no high resolution image appears at the output mask 25.

Since the signal structure on the signal film is produced by all of the signal components, and all but one of the first order images have been removed by the mask 26, the image on the mask 25 will appear as a line of light. The slit 24 is then located to sample this light passing through slit 27 and mask 26. FIG. 4 illustrates the effect of signal motion on the zero and two first diffracted order images. The first order images move in opposite directions as shown in FIG. 4, while the zero order image does not move. High resolution in output slit 24 is obtained by the time sequencing sampling by the slit 27 in mask 26.

A recording film 30 may be located adjacent slit 24 or the light output from slit 24 may be imaged on recording film 30 by means of a relay lens 31 in the manner described in the Blikken et al. application, referred to above. The recording film is also moved by film drive 35. The signal film and recording film run at speeds necessary to give the same reduction for azimuth as for range on the output film, as described in the Blikken et al. application. The speed of recording film with respect to the speed of the signal film is determined by the ratio of range reduction to azimuth reduction existing on the signal film. If 10,000 yards is shown as 35 mm. in the range direction, this same ratio should exist in the azimuth dimension so that the resulting image will be in proper proportion. However, the two ratios are not necessarily equal on the signal film, where, for example, 10,000 feet in azimuth might be represented as 700 mm., while 10,000 ft. in range might be represented as 35 mm. The equalization of the ratios is made by adjusting the speed ratio between signal film and recording film. For the example stated, the recording film should move $\frac{1}{20}$ the speed of the signal film in order to bring the image to proper proportions.

There is thus provided a device for processing wave trains in a great number of channels wherein the astigmatic lens combination between the signal film and the output film is made unnecessary.

While correction in focus with range has been described in this application as being accomplished with a conical lens, any of the other systems described in the Blikken et al. application, referred to above, may be used. Also it is obvious that other modifications may be made without departing from the general principle and scope of the invention.

I claim:

1. An apparatus for processing a signal film from an airborne coherent side-looking radar, having thereon Doppler frequency azimuth target information in a direction along the length of the film and range information across the film, comprising: said signal film, means for illuminating said signal film with monochromatic light collimated in the azimuth direction, means for moving said film through said light in the azimuth direction, a mask, means for imaging the range and azimuth information from said signal film on said mask, means located between said signal film and said mask for removing all but one of the first diffracted order images of the signal on said signal film, an output slit in said mask for sampling the light from said first diffracted order image, output means for receiving light passing said output slit, and means located within said optical system for correcting for the change of focus with range on said signal film.

2. An apparatus for processing a signal film from an airborne coherent side-looking radar, having thereon Doppler frequency azimuth target information in a direction along the length of the film and range information across the film, comprising: said signal film, means for illuminating said signal film with monochromatic light collimated in the azimuth direction, means for moving said film through said light in the azimuth direction, a recording film, a mask adjacent said recording film, means for imaging the range and azimuth information from said signal film on said mask, means located between said signal film and said mask for removing all but one of the first diffracted order images of the signal on said signal film, an output slit in said mask for sampling the light from said first diffracted order image and for passing said light to said recording film, and means located within said optical system for correcting for the change of focus with range on said signal film.

3. An apparatus for processing a signal film from an airborne coherent side-looking radar, having thereon Doppler frequency azimuth target information in a direction along the length of the film and range information across the film, comprising: said signal film, means for producing a beam of monochromatic light; means for moving said film through said light in the azimuth direction; a first mask, having a slit therein, located between said beam producing means and said film; said slit being narrow in the azimuth direction and elongated in the range direction; means located between said first mask and said film for collimating the light in the azimuth direction; a second mask; means for imaging the range and azimuth information from said signal film on said second mask; a third mask located between said signal film and said second mask; said mask having a slit therein in the position of the first diffracted order images of the signal on said signal film; an output slit in said second mask for sampling the light passing through the slit in said third mask; output means for receiving light passing said output slit; and means located within said optical system for correcting for the change of focus with range on said signal film.

4. An apparatus for processing a signal film from an airborne coherent side-looking radar, having thereon Doppler frequency azimuth target informaton in a direction along the length of the film and range information across the film, comprising: said signal film, means for producing a beam of monochromatic light; means for moving said film through said light in the azimuth direction; a first mask, having a slit therein, located between said beam producing means and said film; said slit being narrow in the azimuth direction and elongated in the range direction; means located between said first mask and said film for collimating the light in the azimuth direction; a recording film; a second mask adjacent said recording film; means for imaging the range and azimuth information from said signal film on said second mask; means located between said signal film and said second mask for removing all but one of the first diffracted order images of the signal on said signal film; an output slit in said second mask for sampling the light from said first diffracted order images and means located within said optical system for correcting for the change of focus with range on said signal film.

5. An apparatus for processing a signal film from an airborne coherent side-looking radar, having thereon Doppler frequency azimuth target information in a direction along the length of the film and range information across the film, comprising: said signal film, means for producing a beam of monochromatic light; means for moving said film through said light in the azimuth direction; a first mask having a slit therein, located between said beam producing means and said film; said slit being narrow in the azimuth direction and elongated in the range direction; means located between said first mask and said film for collimating the light in the azimuth direction; a recording film; a second mask adjacent said recording film; means for imaging the range and azimuth information from said signal film on said second mask; a third mask located between said signal film and said second mask; said mask having a slit in the position of the first diffracted order images of the signal on said signal film; an output slit in said second mask for sampling the light passing the slit in said third mask; and means located within said optical system for correcting for the change of focus with range on said signal film.

References Cited

UNITED STATES PATENTS 2,451,465  10/1948  Barney _____ 343—100.7

VERLIN R. PENDEGRASS, *Primary Examiner.*

U.S. Cl. X.R.

355—2